Sept. 23, 1924.

O. K. GARRARD

TAILSTOCK

Filed June 27, 1922

1,509,505

INVENTOR
Ohmer Kenneth Garrard
BY
A. G. Burns ATTORNEY

Patented Sept. 23, 1924.

1,509,505

UNITED STATES PATENT OFFICE.

OHMER KENNETH GARRARD, OF FORT WAYNE, INDIANA.

TAILSTOCK.

Application filed June 27, 1922. Serial No. 571,162.

*To all whom it may concern:*

Be it known that I, OHMER KENNETH GARRARD, a citizen of the United States of America, and resident of Fort Wayne, in the county of Allen and State of Indiana, have invented certain new and useful Improvements in Tailstocks, of which the following is a specification.

This invention relates to improvements in tail stocks for lathes, grinding machines, etc., and the object thereof is to provide a self-adjusting center support for revolving parts to be machined especially in rapid manufacturing operations where the duplication of the parts are involved. Another object is to provide a spring compressed spindle and an adjustable stop therefor so that the center, carried by the spindle, will bear with like force in supporting the duplicate parts as they are placed in the machine in succession. And a further object is to provide a clamping means for the spindle that will admit of adjustment so that the operating arm thereof may be definitely positioned at any desired angle.

These objects are accomplished by the construction illustrated in the accompanying drawings, in which:—

Figure 1:
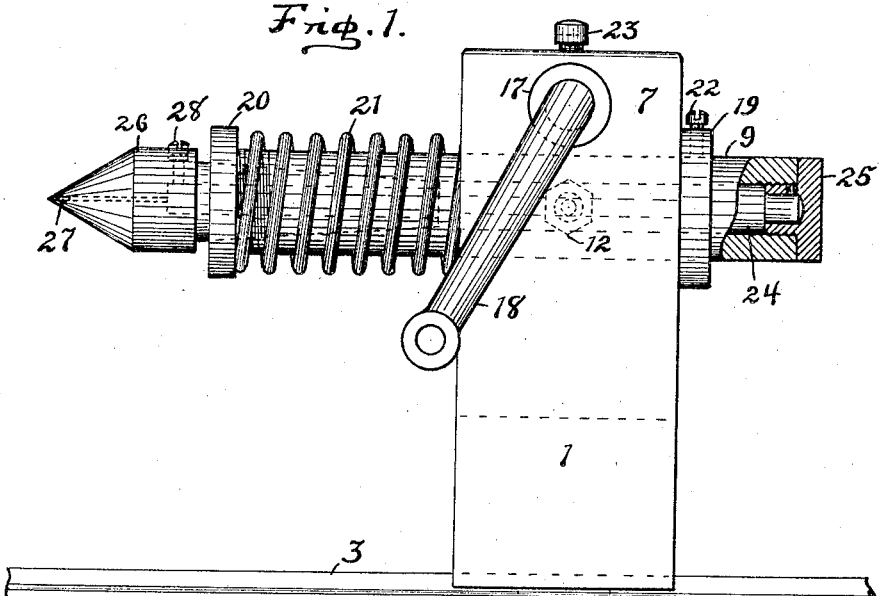
Figure 2:
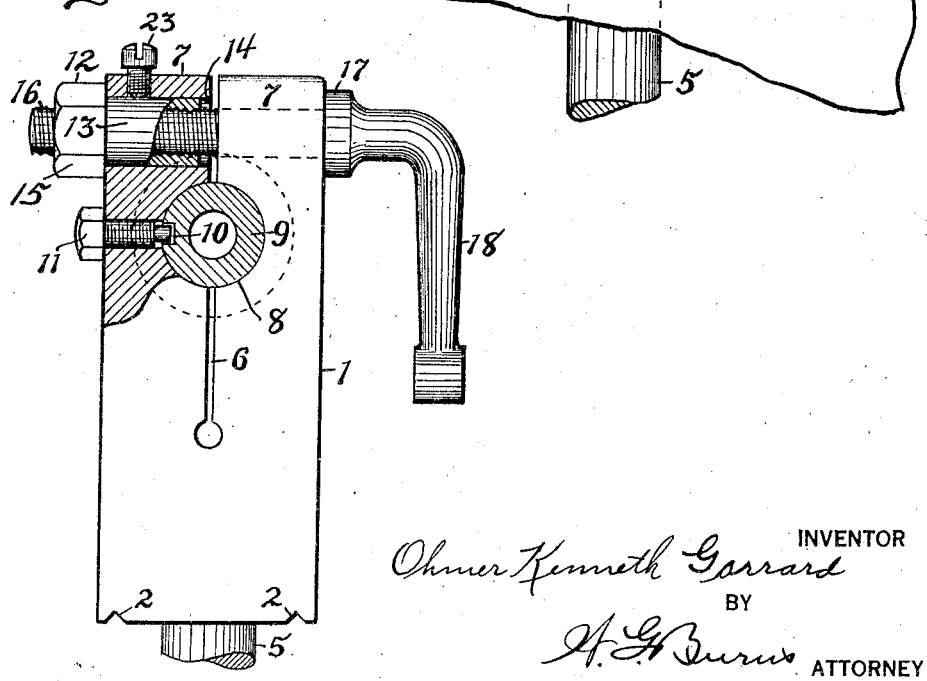

Fig. 1 is a side elevation of a tail stock embodying the invention, a portion thereof being broken away; and Fig. 2 is a front elevation of the tail block including the clamping means and the spindle, portions being broken away.

The characters appearing in the description refer to parts shown in the drawings and designated thereon by corresponding characters:

The invention comprises a tail block 1, the bottom of which is grooved, as indicated by 2, so as to fit upon the ways 3 of the bed 4 of a lathe, grinding or other machine, upon which it is adapted to be secured by a bolt 5. The upper portion of the tail block is bifurcated, there being a slot 6 therein so that the sides of the tail block form jaws 7 that are spaced apart. A horizontal opening 8 in the tail block between its jaws is made to receive a longitudinally movable spindle 9 which extends therethrough. The spindle has in one side thereof a key-way 10 into which extends a cap-screw 11 in one of the jaws 7, so as to prevent the spindle from turning in the tail block.

In one of the jaws 7 is positioned an adjusting member 12 having a sleeve 13, that extends into an opening 14 in the jaw and which is adapted to be adjustably turned therein by manipulating its head 15. The adjusting member is internally threaded and fits upon a threaded shaft 16 that extends through both of the jaws. The shaft has a shoulder 17 that bears against the outer face of the jaw, opposite the adjusting member, and the inner face of the head 15 bears against the outer face of the other jaw so that as the shaft is turned in one direction in the adjusting member the jaws are drawn toward each other, and relieved, when the shaft is turned in the opposite direction. In this manner the spindle 9 is held tightly between the jaws, or loosely, accordingly as the shaft is manipulated. The end of the shaft 16, adjacent the shoulder 17 is bent and formed into an operating arm 18 by means of which the shaft is manipulated.

An adjustable stop 19 is mounted on the rear end of the spindle 9 and is adapted to limit the forward movement of the spindle by coming into contact with the rear face of the tail block, and upon the front end of the spindle is an adjustably mounted flange 20, there being an open coil compression spring 21 on the spindle that bears at one end against the flange 20 and at its opposite end against the front face of the tail block so that the spindle is yieldingly held in its foremost position. The flange 20 being threaded on the spindle, may be turned thereon so as to adjustably alter the stress of the spring.

The stop 19 has a set-screw 22 for holding it in adjusted positions on the spindle, and the sleeve 13 is held from turning in the jaw in which it is mounted by a set-screw 23 in the corresponding jaw.

It is desirable in the rapid duplication of parts where a supporting dead center is employed, to provide automatic lubrication for the center, and therefore, the spindle is provided with a chamber 24 for holding a quantity of lubricating oil, there being a plug 25 for closing the rear end of the spindle. In the front end of the spindle is positioned a chambered center 26 having a duct 27, the outer end of which terminates near the point of the center, the intention being to admit of the outward passage of the lubricant contained in the spindle. In the top of the center is a screw-plug vent 28 for regulating the admission of air into the hollow center. The cap-screw engagement in the key-way of the spindle prevents the spindle from turning and in this manner the screw-plug in the center is held in uppermost position.

In utilizing the invention the tail stock thus constructed is secured on the bed of the machine so that the center is held in normal position for supporting the work to be operated upon. The flange 20 is turned upon the spindle so as to compress the spring to a degree sufficient to move the spindle forwardly with the center bearing against the supported part, to be operated upon, with the desired force. The stop 19 is then moved against the adjacent face of the tail block and secured fixedly upon the spindle. The jaws are then clamped upon the spindle, which is thereby held rigidly, by the clamping means comprised of the shaft and adjusting member by manipulating the operating arm.

For the convenience of the operator, or in the event a pedal attachment, (not shown) is connected with the operating arm, it may be desirable that the operating arm, when the jaws are clamped, shall extend at a particular angle. This may be attained by turning the adjusting member 12 so that the operating lever will extend at the desired angle.

When the device is thus adjusted the duplicate parts, as they are placed in the machine, will be held with like firmness. When removing the parts from the machine the jaws are unclamped so as to admit longitudinal movement of the spindle, and the parts are pressed against the center so as to move the spindle backwardly against the compression of the spring sufficiently to admit their removal from between the centers of the machine. In placing the parts in the machine they are pressed against the center 26 so as to force the spindle back sufficiently to admit of being placed between the centers of the machine, after which the jaws are again clamped.

What I claim is:—

1. In a tail stock for machines of the class described, a bifurcated tail block having a pair of jaws; a longitudinally movable spindle extending between the jaws; a clamping means for said jaws; an adjustable stop on one end of the spindle acting against the tail block; an adjustable flange on the opposite end of the spindle; an open coil compression spring on the spindle between said flange and the adjacent face of the tail block; means to prevent turning movement of the spindle in the tail block; and a supporting center in the forward end of the spindle.

2. In a tail stock for machines having jaws spaced apart; a spring pressed spindle extending between the jaws; an internally threaded adjusting member bearing against the outer face of one of said jaws and having turning adjustment relative to said jaw; means for holding the adjusting member in adjusted positions in the jaw; a threaded shaft extending through the adjusting member and having a shoulder bearing against the outer face of the opposite jaw and having also operating means; and a center supported by the spindle.

3. In a tail stock having a block provided with a pair of jaws and a spindle extending through the block between said jaws, a clamping means comprising an internally threaded sleeve nut, the sleeve of which has turning movement in one of said jaws and the head of which bears against the outer face of said jaw; means for securing said sleeve nut from turning in said jaw; and a clamp screw extending through the opposite jaw and engaging the sleeve nut, and having a shoulder that bears against the outer face of said opposite jaw so that said jaws are clamped upon the spindle by turning the clamp screw in said sleeve nut.

In testimony whereof I affix my signature in presence of two witnesses.

OHMER KENNETH GARRARD.

Witnesses:
 MATILDA METTLER,
 WALTER G. BURNS.